(12) United States Patent
Ortenberg et al.

(10) Patent No.: US 8,578,204 B1
(45) Date of Patent: Nov. 5, 2013

(54) WITNESS FACILITY FOR DISTRIBUTED STORAGE SYSTEM

(75) Inventors: Eugene Ortenberg, Falls Church, VA (US); Bradford B. Glade, Harvard, MA (US); Dale Hagglund, Edmonton (CA); Benjamin Yoder, Westborough, MA (US); David Meiri, Cambridge, MA (US); Dan Arnon, Somerville, MA (US); Dharmesh Thakkar, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 357 days.

(21) Appl. No.: 12/930,121

(22) Filed: Dec. 29, 2010

(51) Int. Cl.
*G06F 11/07* (2006.01)

(52) U.S. Cl.
USPC ............... 714/4.11; 714/2; 714/4.1; 714/6.2

(58) Field of Classification Search
USPC ....................... 714/2, 4.1, 4.11, 6.2
See application file for complete search history.

(56) References Cited

U.S. PATENT DOCUMENTS

| | | | |
|---|---|---|---|
| 5,742,792 A | 4/1998 | Yanai et al. | |
| 7,266,706 B2 | 9/2007 | Brown et al. | |
| 7,577,722 B1 | 8/2009 | Khandekar et al. | |
| 7,668,879 B2 * | 2/2010 | Vivian et al. | 714/4.1 |
| 7,822,939 B1 | 10/2010 | Veprinsky et al. | |
| 7,836,018 B2 | 11/2010 | Oliveira et al. | |
| 8,255,369 B2 * | 8/2012 | Luo et al. | 707/674 |
| 8,266,474 B2 * | 9/2012 | Goel | 714/4.2 |
| 2004/0078654 A1 * | 4/2004 | Holland et al. | 714/13 |
| 2005/0204184 A1 * | 9/2005 | Endo | 714/4 |
| 2006/0031450 A1 | 2/2006 | Unrau et al. | |
| 2006/0069887 A1 | 3/2006 | LeCrone et al. | |
| 2006/0111880 A1 * | 5/2006 | Brown et al. | 703/1 |
| 2006/0123057 A1 * | 6/2006 | Zelenka et al. | 707/104.1 |
| 2006/0271341 A1 * | 11/2006 | Brown et al. | 703/1 |
| 2008/0126845 A1 * | 5/2008 | Luo et al. | 714/6 |
| 2008/0184061 A1 * | 7/2008 | Tripathi et al. | 714/4 |
| 2009/0070541 A1 | 3/2009 | Yochai | |
| 2009/0112789 A1 | 4/2009 | Oliveira et al. | |
| 2009/0112811 A1 | 4/2009 | Oliveira et al. | |
| 2009/0112880 A1 | 4/2009 | Oliveira et al. | |
| 2009/0112921 A1 | 4/2009 | Oliveira et al. | |
| 2009/0144720 A1 * | 6/2009 | Roush et al. | 717/171 |
| 2009/0276657 A1 * | 11/2009 | Wetmore et al. | 714/4 |
| 2010/0318610 A1 * | 12/2010 | Hisgen et al. | 709/205 |
| 2011/0252270 A1 * | 10/2011 | Abraham et al. | 714/4.1 |

OTHER PUBLICATIONS

J. Matthews et al., "Virtual Machine Contracts for Datacenter and Cloud Computing Environments," ACDC '09, Jun. 19, 2009, Barcelona, Spain, 6 pp.

(Continued)

*Primary Examiner* — Chae Ko
(74) *Attorney, Agent, or Firm* — Muirhead and Saturnelli, LLC (57) ABSTRACT

A system for managing distributed storage includes a collection of one or more compute sites that are connected and that perform a joint computation. A witness node is connected to the one or more compute sites. A membership service allows a change in collection membership, in response to a failure, to continue the joint computation without causing data inconsistency or corruption. If the membership service is unable to reach a decision on the change in collection membership in response to the failure, the witness node controls the decision on the change in collection membership to continue the joint computation. A distributed storage system provided by the system described herein may advantageously meet consistency guarantees and maximize data access even when individual compute sites and/or their interconnects fail.

19 Claims, 6 Drawing Sheets

(56) References Cited

OTHER PUBLICATIONS

W. Zheng et al., "Cloud Service and Service Selection Algorithm Research," GEC '09, Jun. 12-14, 2009, Shanghai, China, pp. 1045-1048.

"Architectural Strategies for Cloud Computing," Oracle White Paper in Enterprise Architecture, Aug. 2009, 18 pp.

"VMware Virtual Machine File System: Technical Overview and Best Practices," VMware Technical White Paper, Version 1.0, WP-022-PRD-01-01, 2007, 19 pp.

"IT in the Cloud: Using VMware vCloud for Reliable, Flexible, Shared IT Resources," VMware White Paper, 2008, 8 pp.

"VMware vSphere, the First Cloud Operating System, Provides an Evolutionary, Non-disruptive Path to Cloud Computing," VMware White Paper, 2009, 8 pp.

"EMC Symmetrix VMAX and VMware Virtual Infrastructure: Applied Technology," EMC Corporation, White paper, May 2010, 44 pp.

U.S. Appl. No. 12/653,981, filed Dec. 18, 2009, Gong et al.

"Using VMware Virtualization Platforms with EMC VPLEX: Best Practices Planning," EMC Corporation, White paper, Aug. 2010, 45 pp.

"Workload Resiliency with EMC VPLEX: Best Practices Planning," EMC Corporation, White paper, May 2010, 19 pp.

"Implementation and Planning Best Practices for EMC VPLEX," EMC Corporation, Technical Notes, Oct. 25, 2010, 37 pp.

D. Leijen et al., "Parallel Performance: Optimize Managed Code for Multi-Core Machines," MSDN Magazine, Oct. 2007, 11 pp.

\* cited by examiner

WITNESS FACILITY FOR DISTRIBUTED STORAGE SYSTEM

TECHNICAL FIELD

This application is related to the field of data storage and, more particularly, to systems for managing data sharing on a storage network.

BACKGROUND OF THE INVENTION

In current storage networks, and particularly storage networks including geographically remote access nodes and storage resources, preserving or reducing bandwidth between resources and access nodes is highly desirable as well as providing optimized data availability and access. Data access may be localized, in part to improve access speed to pages requested by host devices. Caching pages at access nodes provides localization, however, it is desirable that the cached data be kept coherent with respect to modifications at other access nodes that may be caching the same data. An example of a system for providing distributed cache coherence is described in U.S. Patent App. Pub. No. 2006/0031450 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

In an active/active storage system, if there are multiple interfaces to a storage device, each of the interfaces may provide equal access to the storage device. With active/active storage access, hosts in different locations may have simultaneous read/write access via respective interfaces to the same storage device. Various failures in an active/active system may adversely impact synchronization and hinder the ability of the system to recover. For example, in an active/active system in which a particular interface is preconfigured as, or otherwise biased to be, the principal interface or "winner" in the event of an network partition or node failure within a cluster of nodes, failure of that interface may result in data unavailability, data corruption and/or other problems. Other known solutions to active/active failure handling may include use of a quorum disk that resolves tie-break situations when a voting group of nodes disagree on the current state of a cluster. However, the use of physical quorum disks may be expensive to deploy and lack flexibility.

Accordingly, it would be desirable to provide an effective and efficient system to address issues like that noted above for a distributed storage system, particularly an active/active storage system.

SUMMARY OF THE INVENTION

According to the system described herein, a system for managing a distributed system includes a plurality of compute sites that are connected to perform a joint computation, at least one witness node that is connected to the plurality of compute sites, and a membership service that allows a change in collection membership for the plurality of compute sites, in response to a failure, to maintain the joint computation, where, in response to the membership service being unable to reach a decision on the change in the collection membership in response to the failure, the at least one witness node controls the decision on the change in the collection membership to maintain the joint computation. In response to the failure being a communication failure that causes a split of the collection into at least two non-communicating sets of compute sites for which the membership service is unable to reach a decision, the at least one witness node may select at least one of the sets to continue the joint computation.

The membership service may use a majority voting system to attempt to decide on the change in collection membership. The majority voting system may grant votes according to at least one of: (i) one vote to each compute site in the plurality of compute sites or (ii) different voting weights to different compute sites in the plurality of compute sites. In response to the failure being a failure over a period of time of a subset of the compute sites that possess exactly half of voting power in the majority voting system, the at least one witness node may select a subset of the compute sites that possess a remaining half of the voting power to continue the joint computation in more than 50% of cases. In response to the failure being a failure of a subset of the compute sites at a same time that possess exactly half of available voting power in the majority voting system, the at least one witness node may select a subset of the compute sites that possess a remaining half of the available voting power to continue the joint computation in 100% of cases.

The joint computation may include a plurality of independent sub-computations. In response to the failure being a communication failure that causes a split of the plurality of compute sites into at least two non-communicating sets of the compute sites for which the membership service is unable to reach the decision, the at least one witness node may select a plurality of selected sets to continue the joint computation, where each of the selected sets may be different for different sub-computations of the joint computation. The membership service may use a majority voting system to attempt to decide on the change in collection membership, and the majority voting system may weigh each of the computation sites differently depending on a particular sub-computation of the different sub-computations. The joint computation may include operations of a clustered SCSI device. The SCSI device may use external storage nodes, and each of the external storage nodes may be accessed by the compute sites and/or a plurality of the compute sites. Each of the compute sites may include a single processor and/or a local cluster of processors. An alert may be issued by a compute site in the plurality of compute sites that loses a connection to the at least one witness node and/or the at least one witness node that loses a connection to at least one of the compute sites in the plurality of compute sites.

A role of a particular compute site in the joint computation may be suspended when the particular compute site is unable to complete a verification process that verifies that the membership service has decided to keep the particular compute site as a member of the plurality of compute sites. The particular compute site being unable to complete the verification process may include (i) lost connectivity of the particular compute site and/or (ii) the membership service being unable to reach the decision on the change in the collection membership. The particular compute site that suspends the role in the joint computation may notify the at least one witness node of a suspended state of the particular compute site. The at least one witness node may take a decision action when the at least one witness node learns of a suspended set of compute sites having at least half of voting power in a majority voting system of the membership service. The decision action may be driven by a decision table that is based on which of the one of more compute sites of the plurality of compute sites are in the suspended set of compute sites and which of the one of more compute sites of the plurality of compute sites are accessible to the at least one witness node. A compute site that leaves the plurality of compute sites may be allowed to rejoin the plurality of compute sites and resume participation in the joint computation.

According further to the system described herein, a non-transitory computer readable-medium includes computer software for managing a distributed system. The software includes executable code that performs a joint computation among a plurality of compute sites that are connected, executable code provided on at least one witness node that is connected to the plurality of compute sites, and executable code that provides a membership service that allows a change in collection membership for the plurality of compute sites, in response to a failure, to maintain the joint computation, where, in response to the membership service being unable to reach a decision on the change in the collection membership after the failure, the executable code provided on the at least one witness node controls the decision on the change in the collection membership to continue the joint computation.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
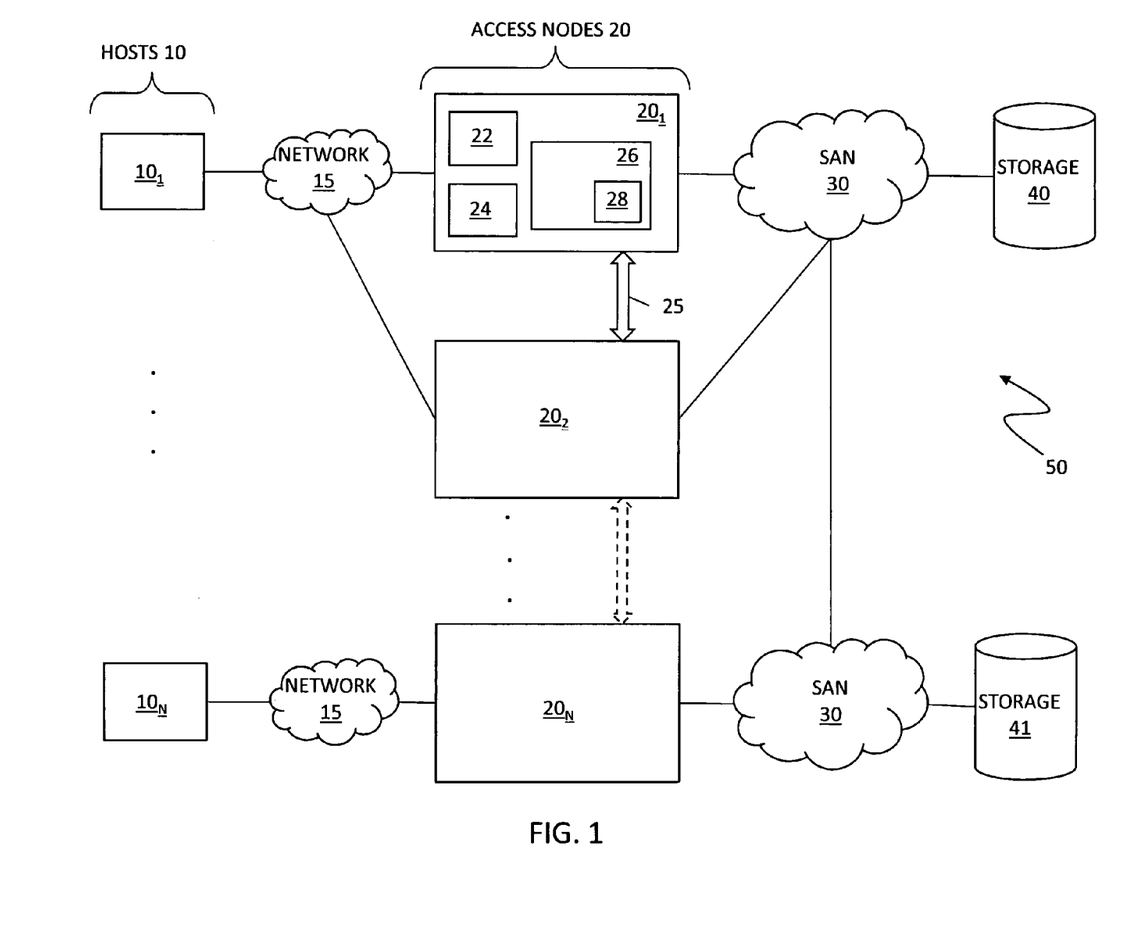
FIG. 1 shows a network configuration that may be used in accordance with an embodiment of the system described herein.

FIG. 1 shows a network configuration 50 that may be used in accordance with an embodiment of the system described herein. As shown, a plurality of host devices 10 ($10_1$ to $10_N$) are communicably coupled with a plurality of access nodes 20 ($20_1$, $20_2$ to $20_N$). Each of the access nodes 20 may include a processor (CPU) component 22, such as a microprocessor or other intelligence module, a cache component 24 (e.g., RAM cache), an instance of a distributed cache manager 26 and/or other local storage and communication ports. (In general, "N" is used herein to indicate an indefinite plurality, so that the number "N" when referred to one component does not necessarily equal the number "N" of a different component. For example, the number of hosts 10 does not, but may, equal the number of access nodes 20 in FIG. 1.) Cache memory may be considered memory that is faster and more easily accessible by a processor than other non-cache memory used by a device.

Each of the hosts 10 may be communicably coupled to one or more of access nodes 20 over one or more network connections 15. It is noted that host devices 10 may be operatively coupled with access nodes 20 over any of a number of connection schemes as required for the specific application and geographical location relative to each of the access nodes 20, including, for example, a direct wired or wireless connection, an Internet connection, a local area network (LAN) type connection, a wide area network (WAN) type connection, a VLAN, a proprietary network connection, a Fibre channel (FC) network etc.

Each of the access nodes 20 may also include, or be communicably coupled with, one or more volume management functions (VMFs), and may be communicably coupled with one or multiple storage resources 40, 41, each including one or more disk drives and/or other storage volume, over one or more storage area networks (SAN) 30, and/or other appropriate network, such as a LAN, WAN, etc. The access nodes 20 may be located in close physical proximity to each other or one or more may be remotely located, e.g., geographically remote, from other access nodes. Each of the access nodes 20 may also be able to, intercommunicate with other access nodes over a network 25, such as a private network, a peripheral component interconnected (PCI) bus and/or a Fibre channel (FC) network. In other embodiments, the access nodes may also be able to communicate over the SAN 30 and/or over the network 15. Several of the access nodes 20 may be grouped together at one or more sites in connection with the multiple storage resources 40, 41 and in which the sites are geographically distant from one another. The system described herein may be used in connection with a VPLEX product produced by EMC Corporation of Hopkinton, Mass. The system described herein may also be used in connection with a Remote Data Facility (RDF) storage product produced by EMC Corporation, such as a Symmetrix product. Although discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of access nodes. In general, the distributed cache manager 26 may include a module with software executing on a processor or other intelligence module (e.g., ASIC) in an access node. The distributed cache manager 26 may be implemented in a single access node or distributed across multiple intercommunicating access nodes. In certain aspects, each of the access nodes 20 may be embodied as a controller device, or blade, communicably coupled to the storage network 30 that allows access to data stored on the storage network. However, it may be appreciated that a access node may also be embodied as an intelligent fabric switch, a hub adapter and/or other appropriate network device. Because Locality Conscious Directory Migration (LCDM) is applicable to databases, any suitable networked compute node may be configured to operate as an access node with distributed cache manager functionality. For example, a distributed cache manager may be run on a desktop computer with a network connection.

According to the system described herein, a distributed storage system may enable a storage device to be exported from multiple distributed access nodes, which may be either appliances or arrays, for example. With an active/active storage system, hosts in different locations may have simultaneous write access to same exported storage device through a local front-end thereof (i.e., an access node). The distributed storage system may be responsible for providing globally consistent and coherent data access. A witness facility/node, as further discussed elsewhere herein, may enable the distributed storage system to meet consistency guarantees and maximize data access even when individual front-ends and/or their interconnects fail.

Figure 2:
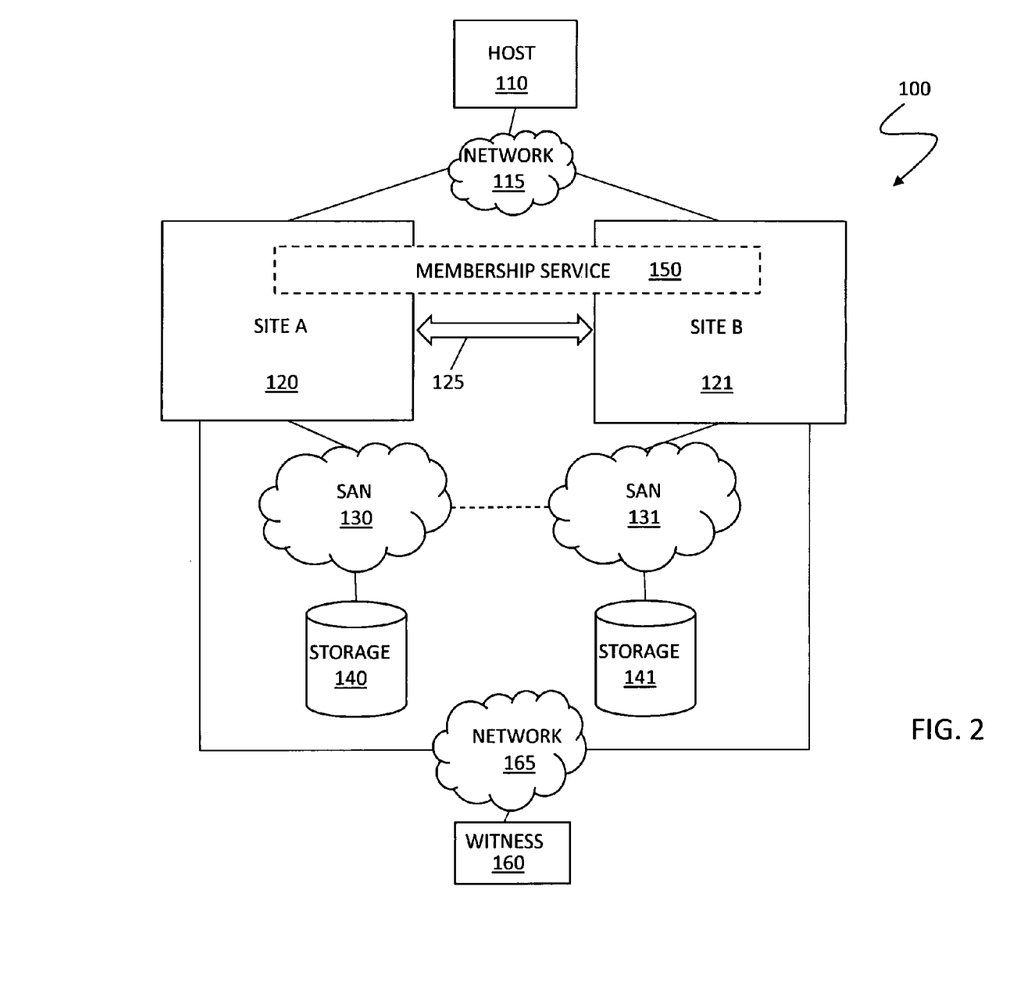
FIG. 2 is a schematic illustration showing a distributed storage system according to an embodiment of the system described herein.

FIG. 2 is a schematic illustration showing a distributed storage system 100 according to an embodiment of the system described herein. The system may include a plurality of multiple compute sites, such as site A 120 and site B 121, that may each include one or more access nodes like the access nodes 20 discussed elsewhere herein. The plurality of multiple compute sites form a collection of sites. Although two compute sites are shown, more than two compute sites may be used and operated in connection with the system described herein. As further discussed elsewhere herein, the sites 120, 121 may be located geographically distant from each other. In an embodiment, the distributed storage system 100 may operate in an active/active mode in which multiple sites may provide mirroring for at least some of the data and may handle processing of host read/write I/O requests. The sites 120, 121 may be connected via an interconnection 125, such as an IP network, a PCI bus, a FC network and/or any other appropriate type of network. A host 110 is shown that may communicate with the compute sites 120, 121 via a network 115. The host 110 is representative of any number of hosts that may access the distributed storage system 100 via the network 115.

The multiple compute sites 120, 121 may together be engaged in a joint computation in connection with I/O handling requests of one or more hosts like the host 110 and maintaining a consistent global data cache therebetween. The joint computation may include facilitating data mirroring (including possibly allowing write access to multiple sites) as well as managing access to the mirrored data. In another embodiment, the joint computation may include a distributed cache coherence protocol which guarantees data consistency for a distributed active/active storage system. The sites 120, 121 may be coupled via SANs 130, 131 to storage resources 140, 141. The storage resources 140, 141 may be located in proximity to the sites 120, 121 and/or may be remotely located and accessed. In an embodiment, the SANs 130, 131 may be separate networks. Alternatively, in another embodiment, the SANs 130, 131 may be part of the same network, an embodiment shown represented by a dashed line connecting the SANs 130, 131. In various embodiments, the joint computation may include multiple, independent sub-computations and may include operations of a clustered small computer system interface (SCSI) device corresponding to use of external storage nodes that may be accessed by one or more of the sites 120, 121.

A membership service 150 is shown schematically as a system of the sites 120, 121 and may be distributed across the sites 120, 121 in connection with processing of one or more access nodes. The membership service may allow, and make decisions concerning, changes in membership of sites in the collection of sites. Specifically, the membership service may make decision about collection membership in response to a failure of a site or communication between sites so as to allow for the continuing of the joint computation. Decisions about collection membership with respect to continuing the joint computation should be controlled to prevent a split brain mode in which multiple sites act individually with respect to handling host I/O requests (e.g., write requests) in a manner which may cause data divergence between sites and/or violate global consistency of data and/or individually perform computations which may cause the joint computation to become disjointed and the results irreconcilable. The membership service may use a majority voting system to decide on changes to collection membership, for example, in connection with determining at which sites I/O requests should be allowed. For example, the majority voting system may grant each site in the collection one vote. Alternatively, the majority voting system may grant different voting weights to different sites. However, in various failure cases, the majority voting system may not be able to make appropriate decisions concerning the collection membership. The membership service may be able to make an appropriate decision to allow the joint computation to continue if it can determine a majority of the collection membership for any decision. Note that, in some embodiments, the membership service may rely on a majority of votes (as opposed to sites) and/or rely on specific (preconfigured) site or sites to be part of a surviving group. Irrespective of the technique used by the membership service, in instances where the membership service cannot determine a majority of the collection membership for decision, then further decision action may be required as further discussed elsewhere herein, particularly, in the event of an inter-site communication link failure where the membership service may not be able to correctly determine whether a communication failure has occurred and/or whether one of the sites has failed.

According to the system described herein, if the membership service is unable to reach a decision on the change in collection membership in response to the failure, a witness node 160 may arbitrate and/or control the decision on the change in collection membership to maintain the joint computation (i.e., to continue the joint computation being performed in a mutually cohesive fashion to provide consistency of the results.). For example, if the sites 120, 121 contain mirrored data, then, following a failure, the witness node 160 may determine which of the sites 120, 121 continues to receive I/O requests and which of the sites 120, 121 is suspended. In an embodiment herein, the witness node 160 does not contradict the membership service whenever the membership service is capable of providing an appropriate solution. However, the witness node 160 may prevent a disjoint subset from continuing in an inconsistent state.

The witness node may include a processor (CPU) and other computing components (e.g., a virtual machine) or connection components suitable to perform the functions and features described herein. The witness node 160 may be connected to the sites 120, 121 via a network 165. To improve effectiveness and availability, the witness node 160 may be deployed in an independent fault domain. A fault domain is a collection of entities impacted by a given fault. For example, to protect against a given fault of a site disaster, the witness node may be placed at site that is geographically remote from the sites 120, 121. Otherwise, a site disaster event may affect the site with the witness, rendering it unavailable and leading to suspension (freezing) of the joint computation at the surviving site. Further, for example, to respond to intersite communication failures, the network 165 that connects the witness node 160 to the sites 120, 121 may be different than the intersite connection link 125. The given faults to be protected by use of the witness node may depend on customer needs and preferences. In an embodiment, the witness node may be deployed on one or more hosts like that host 110.

Figure 3:
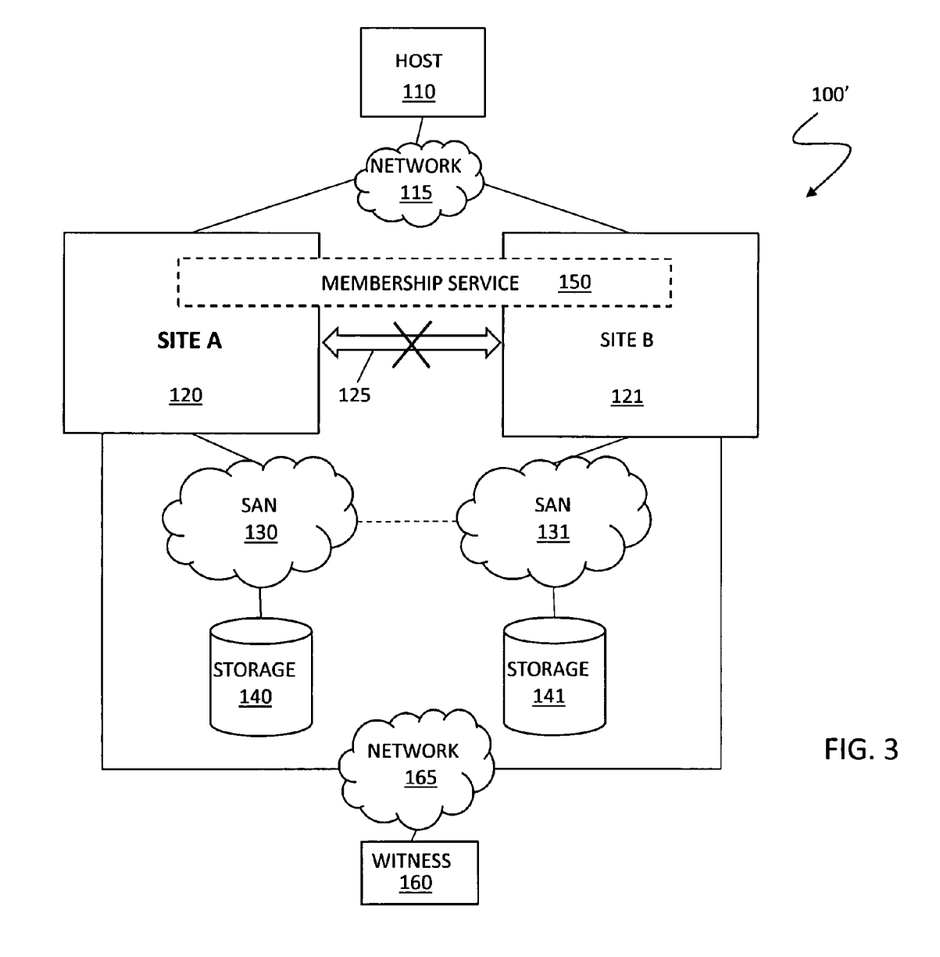
FIG. 3 is a schematic illustration of a distributed storage system further showing a failure of the communication link between the site A and the site B according to an embodiment of the system described herein.

FIG. 3 is a schematic illustration of a distributed storage system 100' that is like the distributed storage system 100 but further showing a failure of the communication link 125 between the site A 120 and the site B 121 according to an embodiment of the system described herein. In connection with the system described herein, the witness 160 may determine a "winner" site which is to continue actively processing I/O requests while the servicing of I/O requests at other sites is suspended and/or otherwise the other sites made no longer active to avoid data corruption issues. In the illustration, site A is shown as being the "winner" site determined by the witness 160. It may be noted that in various embodiments, as further discussed elsewhere herein, the witness 160 may have predetermined which site will be the winner site in the event of certain failures and/or may determine the winner site based on information concerning the particular failure. Note that, in at least some cases, it may be possible to continue to read data from sites other than site A without corrupting the data, but the data read at the other sites is not guaranteed to be current.

The decision of the witness may be made according to various policies. For example, under one policy, for a particular failure in the distributed storage system being a rolling failure of a subset of the compute sites that possess exactly half of voting power in the majority voting system, the witness may select a subset of the compute sites that possess a remaining half of the voting power to continue the joint computation in more than 50% of cases. A rolling failure may be a gradual failure where functions of one or more compute sites fail over a period of time. That is, for example, a compute site may lose the ability to communicate with other compute sites before it loses the ability to communicate with the witness. The compute site may further lose the ability to communicate with different sites at different times. In various instances, the rolling or gradual failure may depend on particular hardware and/or software implementations of the compute site. For example, a device may have multiple ports on multiple boards with multiple power sources, so it may likely fail gradually and lose different connections at different times. If the failing compute site loses communication with one or more other compute sites before it loses communication with the witness, there may be a time window where the witness cannot be sure which compute site is the real cause of the failure and may make an incorrect decision to include the failing compute site in the winning set. The longer the rolling disaster time window gets, the more likely the witness may make a mistake. Accordingly, under policies described herein, in a worst case, the witness may make a random (and possibly incorrect) decision as to the designation of a failing compute site as a winner or loser site.

Under another policy, for example, for the failure being a failure of a subset of the compute sites at a same time (e.g., instantaneous) that possess exactly half of available voting power in the majority voting system, the witness may select a subset of the compute sites that possess a remaining half of the voting power to continue the joint computation in 100% of cases. In an instantaneous failure, all functions of a compute site disappear at the same time. If a compute site fails instantaneously, there is no time window like that in the gradual failure scenario, and the witness may have sufficient information to accurately select the winner site in nearly all such cases. In other embodiments, where a site has been preconfigured as a winner site, the witness may select a subset of compute sites as a winner set that contains the preconfigured winner site in a case where there are exactly two sets of equal voting power weight to choose from.

In other embodiments, the joint computation may include a plurality of independent sub-computations. Accordingly, for a failure being a communication failure that causes a split of the collection into at least two non-communicating sets of the compute sites for which the membership service is unable to reach the decision, the at least one witness node may select different compute site subsets to continue different sub-computations of the joint computation. For example, different sub-computations may correspond to actions taken with respect to different storage nodes and/or different storage volumes, and the selection of one or more of the non-communicating sets, after the communication failure, as a particular "winner" set by the witness may be determined according to factors involving which of the different storage nodes is needed for particular I/O requests. That is, for different sub-computations being performed in connection with different distributed volumes, each of the distributed volumes may have a different pre-configured winner site. In the event of a partition (communication failure) between sites, the different pre-configured winner sites corresponding to the distributed volumes may each continue with the respective sub-computations.

The use of a witness node according to the system described herein may provide enhanced flexibility in the presence of partitions in that, when the witness node detects a partition (as opposed to a site failure or isolation), the witness node may instruct the sites to continue with their pre-configured winner settings. Furthermore, in the presence of a cluster failure or isolation, the witness instructs the survivor site to carry on regardless of winner settings while the isolated site suspends its operation regardless of winner settings.

Figure 4A:
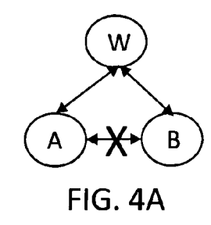
FIGS. 4A-4O are schematic illustrations showing various types of failure scenarios that may handled by a distributed storage system with compute sites A and B and having a witness node (W) according to various embodiments of the system described herein.
Figure 4B:
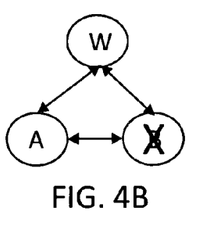
Figure 4C:
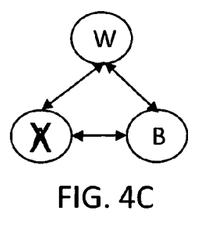
Figure 4D:
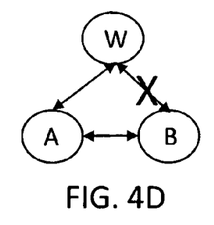
Figure 4E:
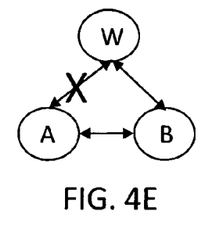
Figure 4F:
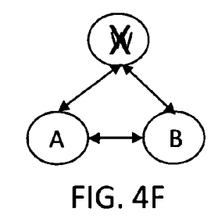
Figure 4G:
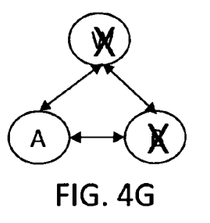
Figure 4H:
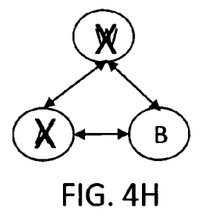
Figure 4I:
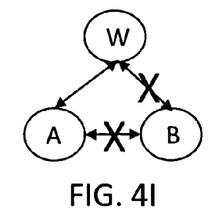
Figure 4J:
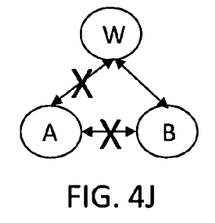
Figure 4K:
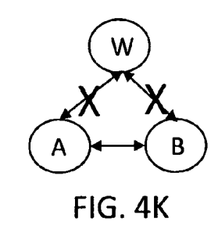
Figure 4L:
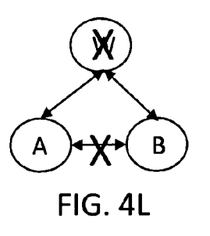
Figure 4M:
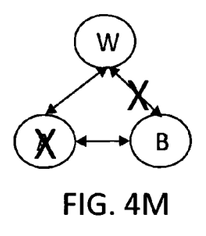
Figure 4N:
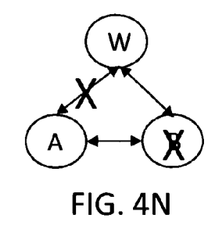
Figure 4O:
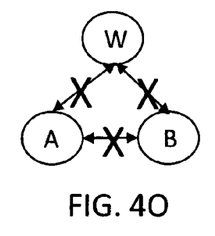

FIGS. 4A-4O are schematic illustrations showing various types of failure scenarios that may handled by a distributed storage system with compute sites A and B and having a witness node (W) according to various embodiments of the system described herein.

FIG. 4A shows failure of the communication link between sites A and B. The witness W may select one of the sites (e.g., as the "winner" site) to continue active I/O request processing and while the other site is suspended. The witness W may select the winner site according to a policy, as further discussed elsewhere herein. In an embodiment, it is noted that compute sites may be suspended automatically when they do not receive guidance from the membership service to continue computation. The witness W may select a winner by giving the winner site the license to continue the computation after the site was suspended.

FIG. 4B shows failure of the site B. The witness W may instruct site A to continue servicing I/O requests.

FIG. 4C shows failure of the site A. The witness W may instruct site B to continue servicing I/O requests.

FIG. 4D shows failure of the communication link between the witness W and site B, and site B remains connected to site A. Both sites may continue servicing I/O requests and site B may issue an alert that contact with the witness W has been lost. Alerts may be issued, for example, to an administrator and, in an embodiment, may use a different network.

FIG. 4E shows failure of the communication link between the witness W and site A, and site A remains connected to site B. Both sites may continue servicing I/O requests and site A may issue an alert that contact with the witness W has been lost. Alerts may be issued, for example, to an administrator and, in an embodiment, may use a different network FIG. 4F shows failure of the witness W. Both sites may continue servicing I/O requests and both sites may issue an alert that contact with the witness W has been lost.

FIG. 4G shows failure of the witness W and site B. Site A may suspend servicing I/O requests and may issue an alert that contact with the witness W and/or site B has been lost.

FIG. 4H shows failure of the witness W and site A. Site B may suspend servicing I/O requests and may issue an alert that contact with the witness W and/or site A has been lost.

FIG. 4I shows failure of the communication link between the witness and site B and between site A and site B. The witness W may instruct site A to continue servicing I/O requests while site B may suspend servicing I/O requests and may issue an alert that contact with the witness W and/or site A has been lost. It may be noted that from the perspective of the survivor site (site A), this scenario may be indistinguishable from that of FIG. 4B. From the perspective of site B, this scenario may be indistinguishable from that of FIG. 4H, which is why site B is suspended.

FIG. 4J shows failure of the communication link between the witness and site A and between site A and site B. The witness W may instruct site B to continue servicing I/O requests while site A may suspend servicing I/O requests and may issue an alert that contact with the witness W and/or site B has been lost. It may be noted that from the perspective of the survivor site (site B), this scenario may be indistinguishable from that of FIG. 4C. From the perspective of site A, this scenario may be indistinguishable from that of FIG. 4G, which is why site A is suspended.

FIG. 4K shows failure of the communication link between site A and the witness W and between site B and the witness W. Both sites A and B may continue servicing I/O requests and may issue alert that contact with the witness W has been lost. For the perspective of both site A and site B, this scenario may be indistinguishable from that of 4F.

FIG. 4L shows failure of the witness and the communication link between site A and site B. Both sites A and B may suspend servicing I/O requests and may issue alerts that contact with the witness W has been lost and/or contact with the other site has been lost.

FIG. 4M shows failure of the communication link between the witness and site B and failure of site A. Site B may suspend servicing I/O requests and may issue an alert that contact with the witness W has been lost and/or contact with site A has been lost.

FIG. 4N shows failure of the communication link between the witness and site A and failure of site B. Site A may suspend servicing I/O requests and may issue an alert that contact with the witness W has been lost and/or contact with site B has been lost.

FIG. 4O shows failure of the communication link between the witness W and site A, between the witness W and site B, and between site A and site B. Both site A and site B may suspend servicing I/O requests and may each issue alerts that contact with the witness W has been lost and/or contact with the other site has been lost.

According to an embodiment of the system described herein, it should be noted that, absent other failures as noted herein, loss of the witness node may not affect the joint computation being performed by the collection of compute sites.

Figure 5:
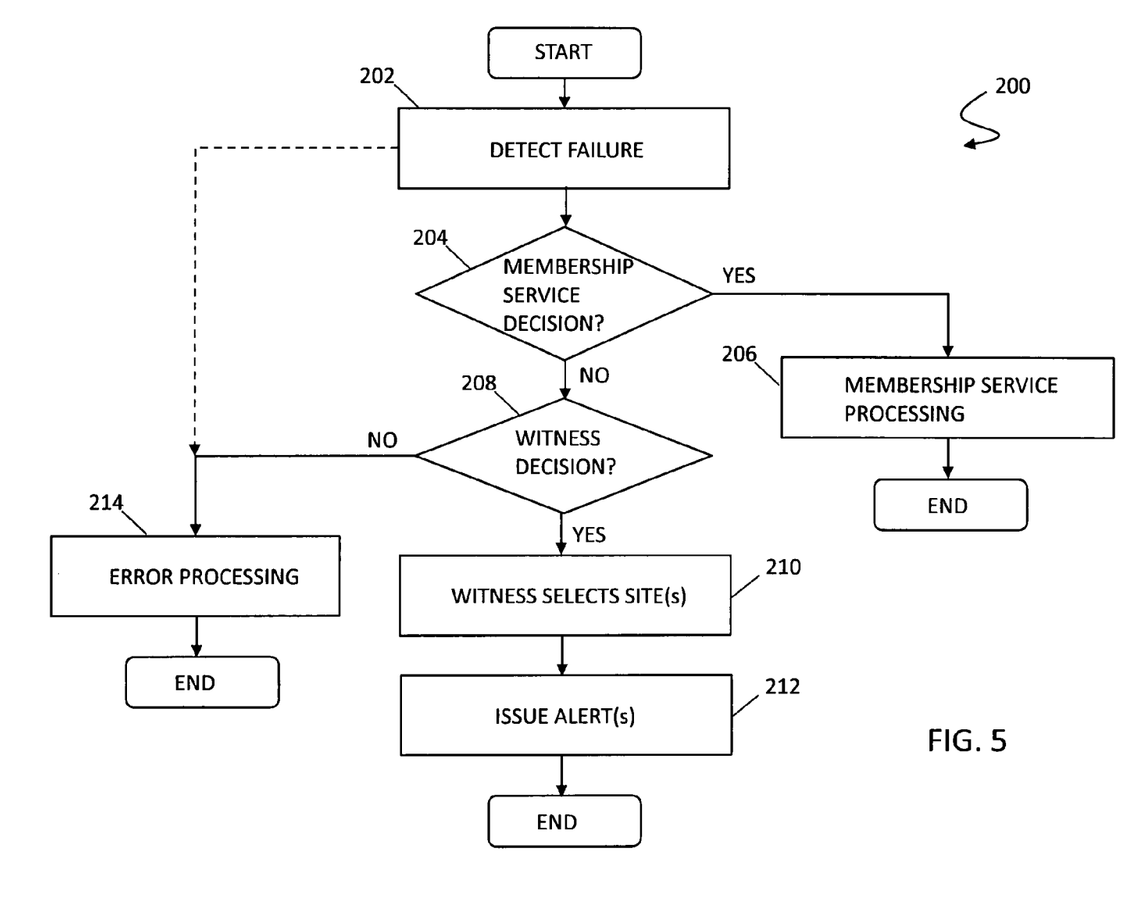
FIG. 5 is a flow diagram showing processing of a distributed storage system in response to a failure according to an embodiment of the system described herein.

FIG. 5 is a flow diagram 200 showing processing of a distributed storage system in response to a failure according to an embodiment of the system described herein. The distributed storage system may have features like those discussed with respect to the distributed storage system 100 and including multiple compute sites and a witness node. At a step 202, a failure in the distributed storage system is detected. As further discussed elsewhere herein, various types of failures may include failure of one or more of the compute sites and the witness node of the system and failure of communication links among the sites and witness node. After the step 202, processing proceeds to a step 204 where it is determined whether a membership service of the distributed storage system can reach a decision to continue the joint computation of the compute sites. If so, then processing proceeds to a step 206 where the membership service makes the decision and performs appropriate processing to implement the decision. As further discussed elsewhere herein, the membership service may ensure that its decisions are globally consistent. The membership service may reach a decision if it can reach the same decision at all sites that are alive. If the membership service cannot guarantee that all alive sites will reach the same decision, the membership service may remain undecided at all sites. After the step 206, processing is complete.

As further discussed elsewhere herein, it should be noted that, absent other failures, a failure causing only loss of the witness node may not affect the joint computation being performed by the collection of compute sites. The system may continue to perform the joint computation and processing of the system described herein may include only the issuing of an alert, e.g., to an administrator, concerning the failure of the witness node. In this embodiment, where a failure is initially determined as being only that of the witness node, processing may proceed from the step 202 directly to an error processing step 214 that includes the issuing of an alert, as further discussed elsewhere herein, and which is illustrated in the figure with a dashed line.

If, at the step 204, it is determined that the membership service cannot reach a decision, then processing proceeds to a step 208 where it is determined whether the witness node is able to force and/or otherwise control the decision concerning the collection membership to continue the joint computation. If so, then processing proceeds to a step 210 where the witness node selects one or more of the compute sites as "winner" sites to continue the joint computation. As further discussed elsewhere herein, the witness node may select the one or more compute sites according to one or more policies. Further, for example, the joint computation may include a plurality of independent sub-computations and the witness node may select different sets of compute sites to continue different sub-computations of the joint computation.

After the step 210, processing proceeds to a step 212 where one or more alerts may be issued by the witness or one or more of the sites concerning the failure. After the step 212, processing is complete. If, at the test step 208, it is determined that the witness cannot control the decision, then processing proceeds to a step 214 where error processing is performed. The error processing may include issuing an alert to an administrator and/or otherwise requesting an action by the administrator. Further, the affected site may unilaterally suspend the computation to prevent corruption. After the step 214, processing is complete.

Figure 6:
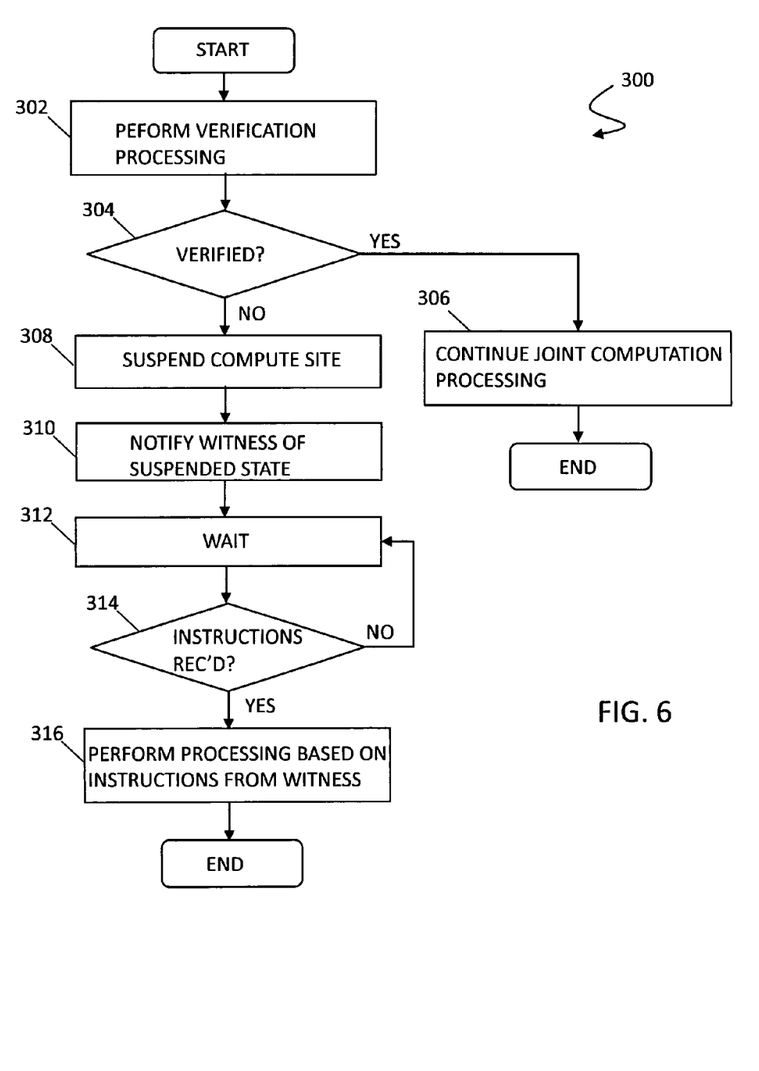
FIG. 6 is a flow diagram showing processing of a compute site in connection with a failure in a distributed storage system according to an embodiment of the system described herein.

FIG. 6 is a flow diagram 300 showing processing of a compute site in connection with a failure in a distributed storage system according to an embodiment of the system described herein. At a step 302, the compute site may perform a verification process to verify that the membership service has decided to keep the particular compute site as a member of the collection. After the step 302, processing may proceed to a test step 304 where the compute site determines whether verification has been successful. If so, then process may proceed to a step 306 where the compute site continues servicing of I/O requests in connection with joint computation as a member of a collection of compute sites. After the step 306, processing in connection with verification operations is complete.

If, at the test step 304, the compute site determines that verification process cannot be completed, then processing may proceed to a step 308 where a role of the compute site in the joint computation is suspended. In various embodiments, the compute site may determine that it is unable to complete the verification process if it determines that it has lost connectivity and/or if it learns that the membership service is unable to reach a decision on whether the compute site should continue joint computation processing as a member of the collection of compute sites. For example, as discussed elsewhere herein, the membership service may be unable to reach a decision in connection with a communication failure between half of the voting power in a majority voting system of the membership service. After the step 308, processing may proceed to a step 310 where the compute site notifies the witness node that is state is suspended (frozen). After the step 310 processing may proceed to a waiting step 312 where the compute site waits to receive instructions from the witness node as to whether it should resume joint computation processing. After the step 312, processing may proceed to a test step 314 where the compute site determines whether it has received instructions from the witness node. If not, then processing returns to the waiting step 312.

If, at the test step 314, the compute site determines that it has received instructions from the witness node, then processing may proceed to a step 316 where the compute site performs processing according to the instructions from the witness node. The witness node may make a decision concerning the suspended compute site, for example as a tie-breaking action, that may be driven according to gathered information and based on policy. For example, the witness node may make a decision according to a decision table that is based on which of one of more compute sites of the collection are in a suspended set of compute sites and which one of more compute sites of the collection are accessible to the witness node. Accordingly, the processing of the compute site in response to the instructions from the witness node may include processing to rejoin the collection of compute sites and resume participation in the joint computation. After the step 316, processing is complete.

A distributed storage system with a witness facility according to the system described herein may further efficiently provide for a clustered host application to implement a quorum disk based on an exported distributed storage device (or mirror). A clustered application, such as MSCS, Oracle, etc., may access this quorum disk through the local site and a locally exported storage device, which is easier and cheaper to deploy than a traditional quorum disk with distributed connectivity.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors (including one or more virtual processors). The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system for managing distributed processing, comprising:
    a plurality of compute sites that are connected to perform a joint computation;
    at least one witness node that is connected to the plurality of compute sites; and
    a membership service that allows a change in collection membership for the plurality of compute sites, in response to a failure, to maintain the joint computation, wherein, in response to the membership service being unable to reach a decision on the change in the collection membership in response to the failure, the at least one witness node controls the decision on the change in the collection membership to maintain the joint computation and wherein the membership service uses a majority voting system to attempt to decide on the change in the collection membership, and wherein the majority voting system weighs each of the computation sites different depending on a particular sub-computation of the different sub-computations.

2. The system of claim 1, wherein, in response to the failure being a communication failure that causes a split of the collection into at least two non-communicating sets of compute sites for which the membership service is unable to reach a decision, the at least one witness node selects at least one of the sets to continue the joint computation.

3. The system of claim 1, wherein the membership service uses a majority voting system to attempt to decide on the change in the collection membership.

4. The system of claim 3, wherein the majority voting system grants votes according to at least one of: (i) one vote to each compute site in the plurality of compute sites and (ii) different voting weights to different compute sites in the plurality of compute sites.

5. The system of claim 3, wherein, in response to the failure being a failure over a period of time of a subset of the compute sites that possess exactly half of voting power in the majority voting system, the at least one witness node selects a subset of the compute sites that possess a remaining half of the voting power to continue the joint computation in more than 50% of cases.

6. The system of claim 3, wherein, in response to the failure being a failure of a subset of the compute sites at a same time that possess exactly half of available voting power in the majority voting system, the at least one witness node selects a subset of the compute sites that possess a remaining half of the available voting power to continue the joint computation in 100% of cases.

7. The system of claim 1, wherein the joint computation includes a plurality of independent sub-computations.

8. The system of claim 7, wherein, in response to the failure being a communication failure that causes a split of the plurality of compute sites into at least two non-communicating sets of the compute sites for which the membership service is unable to reach the decision, the at least one witness node selects a plurality of selected sets to continue the joint computation, wherein each of the selected sets is different for different sub-computations of the joint computation.

9. The system of claim 1, wherein a compute site that leaves the plurality of compute sites is allowed to rejoin the plurality of compute sites and resume participation in the joint computation.

10. The system of claim 1, wherein the joint computation includes operations of a clustered SCSI device.

11. The system of claim 10, wherein the SCSI device uses external storage nodes, and wherein each of the external storage nodes is accessed by at least one of: one of the compute sites or more than one of the compute sites.

12. The system of claim 1, wherein each of the compute sites includes at least one of: a single processor or a local cluster of processors.

13. The system of claim 1, wherein an alert is issued by at least one of: (i) a compute site in the plurality of compute sites that loses a connection to the at least one witness node and (ii) the at least one witness node that loses a connection to at least one of the compute sites in the plurality of compute sites.

14. The system of claim 1, wherein, a role of a particular compute site in the joint computation is suspended when the particular compute site is unable to complete a verification process that verifies that the membership service has decided to keep the particular compute site as a member of the plurality of compute sites.

15. The system of claim 14, wherein the particular compute site being unable to complete the verification process includes at least one of: (i) lost connectivity of the particular compute site and (ii) the membership service being unable to reach the decision on the change in the collection membership.

16. A system for managing distributed processing, comprising:
 a plurality of compute sites that are connected to perform a joint computation;
 at least one witness node that is connected to the plurality of compute sites; and
 a membership service that allows a change in collection membership for the plurality of compute sites, in response to a failure, to maintain the joint computation, wherein, in response to the memberships service being unable to reach a decision on the change in the collection membership in response to the failure, the at least one witness node controls the decision on the change in the collection membership to maintain the joint computation and wherein the particular compute site that suspends the role in the joint computation notifies the at least one witness node of a suspended state of the particular compute site.

17. The system of claim 16, wherein the at least one witness node takes a decision action when the at least one witness node learns of a suspended set of compute sites having at least half of voting power in a majority voting system of the membership service.

18. The system of claim 17, wherein the decision action is driven by a decision table that is based on which of the one of more compute sites of the plurality of compute sites are in the suspended set of compute sites and which of the one of more compute sites of the plurality of compute sites are accessible to the at least one witness node.

19. A non-transitory computer readable-medium including computer software for managing distributed processing, the computer software comprising:
 executable code that performs a joint computation among a plurality of compute sites that are connected;
 executable code provided on at least one witness node that is connected to the plurality of compute sites; and
 executable code that provides a membership service that allows a change in collection membership for the plurality of compute sites, in response to a failure, to maintain the joint computation, wherein, in response to the membership service being unable to reach a decision on the change in the collection membership after the failure, the executable code provided on the at least one witness node controls the decision on the change in the collection membership to continue the joint computation and wherein the membership service uses a majority voting system to attempt to decide on the change in the collection membership, and wherein the majority voting system weighs each of the computation sites differently depending on a articular sub-computation of the different sub-computations.

\* \* \* \* \*